United States Patent Office 2,762,478
Patented Sept. 11, 1956

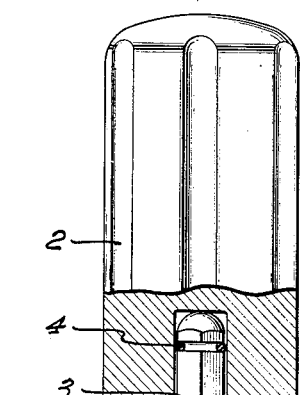
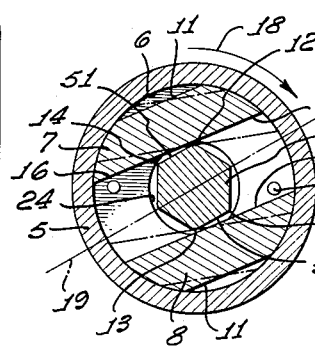
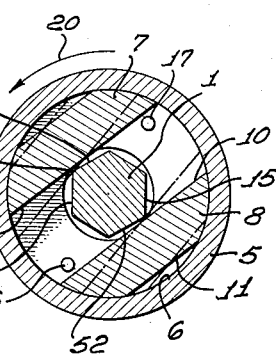
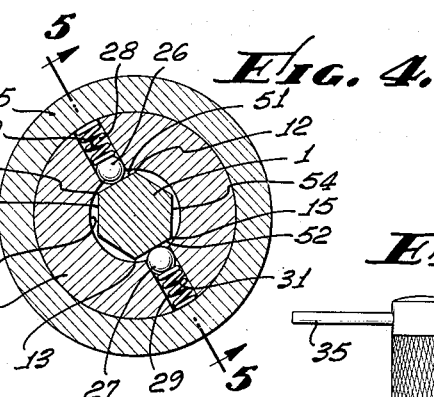
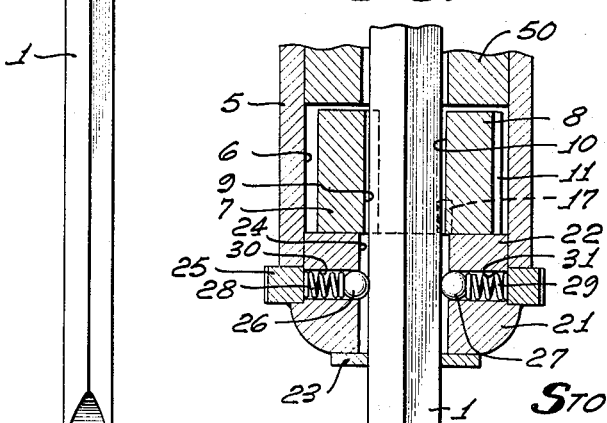
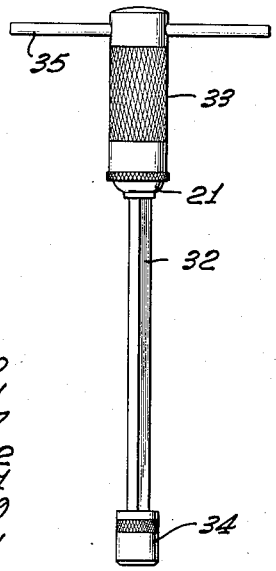
INVENTOR.
STOVER C. WINGER
BY
Flam and Flam
ATTORNEYS.

2,762,478

SELECTIVE ONE-WAY DRIVE

Stover C. Winger, Los Angeles, Calif., assignor of fifteen per cent to John Flam, Beverly Hills, Calif.

Application August 29, 1955, Serial No. 530,948

11 Claims. (Cl. 192—43)

This invention relates to tool drives, such as one-way drives for wrenches, screw drivers, taps, drills, or the like.

It has been common in the past to make it possible to obviate removal of a wrench or screw driver from the head of a screw or bolt, after the screw or bolt is turned by the tool through an angle. For example, a pawl and ratchet drive can be interposed between the handle and the tool, so that the tool could be kept in operative relation to the work; the handle is merely alternately moved in opposite angular directions.

It is one of the objects of this invention to provide a selective one-way drive of this character that is simple and inexpensive, and that renders it unnecessary to machine the parts with any great degree of accuracy, the tolerances being quite generous.

It is another object of this invention to provide a quick and simple mechanism for reversing the direction of the drive.

In order to accomplish these results, a simple friction clutch device is provided, that can be adjusted to slip for either direction of rotation. Such a clutch device can be in the form of segments having friction surfaces adapted to be urged into driving contact with an internal cylindrical surface.

It is another object of this invention to provide a reverser for this type of clutch that can be quickly operated and that has but two positions corresponding, respectively, to the two directions of drive.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view mainly in longitudinal section of a tool, such as a screw driver, incorporating the invention;

Figs. 2 and 4 are enlarged sectional views taken along planes corresponding, respectively, to lines 2—2 and 4—4 of Fig. 1;

Fig. 3 is a view similar to Fig. 2, but showing a position of the parts for obtaining a drive in the reverse direction;

Fig. 5 is a sectional view, taken along a plane corresponding to line 5—5 of Fig. 4; and Fig. 6 is an elevation of a modified form of the invention.

In the present instance, the selective drive mechanism is shown as incorporated in a screw driver having a blade 1 and a handle 2. The blade 1 is shown as of regular polygonal cross-section, such as a hexagon; but any non-circular section may be used. Its inner end is frictionally retained in a bore or recess 3 within the handle 2, as by the aid of an expansible spring ring 4 disposed in a groove near the inner end of the blade 1.

The handle 2 is provided with a tubular member 5, as by a force fit on the reduced cylindrical extension 50 of the handle 2. This member 5 is preferably made of metal and includes an internal cylindrical friction clutching surface 6. This clutching surface 6 is adapted to cooperate with segments 7 and 8 disposed within the tubular member 5. These segments have opposed plane surfaces 9 and 10 and are disposed on opposite sides of the blade 1 as indicated most clearly in Figs. 2 and 3. A flattened portion 11 is provided at the crest of each segment 7 and 8 in order to reduce the area of frictional engagement between the surface 6 and the segments 7 and 8.

These segments overlie opposite flat sides 51 and 52, respectively, of the blade 1.

Considering angular movement of the handle 2 (and consequent angular movement of member 5) in a clockwise direction as viewed in Fig. 2, the plane surfaces 9 and 10 engage, respectively, the opposite corners 12 and 13 of blade 1. This occurs upon a relatively small angular movement. A driving connection is thus established between the handle 2 and the blade 1, since the segments 7 and 8 are urged into strong frictional engagement with surface 6 of member 5. This clutching position is indicated in phantom lines. Without further provision, clutching would also be effected when the handle 2 is moved in a counterclockwise direction. However, in such case, the corners 14 and 15 of the blade are now active to urge the segments 7 and 8 into tight frictional engagement with the interior cylindrical surface 6; this condition is illustrated in phantom lines in Fig. 3.

In order to make it possible to prevent clutching engagement selectively for either direction of rotation, use is made of a pair of diametrically opposite abutments 16 and 17, in the form of pins, and supported in a manner to be hereinafter described. These pins have axes parallel to the axis of blade 1. The positions of these pins 16 and 17 with respect to the blade 1 may be adjusted by means hereinafter described. These abutments or pins cooperate with the plane surfaces 9 and 10. When they are in the position of Fig. 2, a counterclockwise movement of the tubular member 5 would not drive the blade 1, because the pins 16 and 17 engage segments 7 and 8, and prevent movement of these segments into driving contact with the corners 14 and 15. Accordingly, the drive is effective only for clockwise movement of the handle 2, as indicated by the arrow 18.

In this position, therefore, pin 16 cooperates with the surface 9 and pin 17 cooperates with the surface 10. These pins 16 and 17 are equidistant from a line 19 drawn through the axis of the blade 1 and parallel to flat surfaces 51 and 52 of the blade 1, that are adjacent the plane surfaces 9 and 10. Furthermore, the spacing of the pins 16 and 17 from the line 19 is about the same as the distance between opposite flat faces of the blade 1. By this arrangement, therefore, the segments 7 and 8 are prevented from engaging the corners 14 and 15, when the handle 2 is rotated in a counterclockwise direction.

In the position shown in Fig. 3, the drive from the handle 2 to the blade 1 is effected in a counterclockwise direction. As indicated by arrow 20, the pins or abutments 16 and 17 have been rotated through an angle with respect to blade 1, so that now pin 16 cooperates with surface 10 and similarly pin 17 cooperates with surface 9 for preventing frictional coupling for clockwise direction of movement.

Accordingly, the direction of drive is preselected by adjustment of the pins 16 and 17 between the angular positions of Figs. 2 and 3.

For facilitating this adjustment, the pins 16 and 17 are carried by a support 21. This support has a cylindrical extension 22, telescoping within the lower end of the tubular member 5. The pins 16 and 17 are firmly held in appropriate apertures in the member 21, the axes of the pins 16 and 17 being parallel with the axis of the blade 1. A washer 23, or the like, may be firmly pressed upon the blade 1 for restraining the support 21 against substantial axial movement in one direction with respect to the blade 1. Furthermore, the member 21 has a cylindrical central aperture 24 which passes the blade 1 with a slight clearance.

For adjusting the member 21, use is made of a knurled ring 25 pressed upon the extension 22.

To maintain the abutments or pins 16 and 17 in either of their two adjusted positions, use is made of a pair of spring-pressed detents 26 and 27. These detents may be in the form of balls urged against the opposite flat sides of the blade 1, by the aid of coiled springs 28 and 29. These springs and the balls are accommodated in radial apertures 30 and 31 (Fig. 4). The outer ends of these apertures are closed by the ring 25. The detents 26 and 27 can be arranged, for example, to cooperate either with the flat sides 51, 52 or adjacent flat sides 53, 54 (Fig. 4).

The support 21 may thus be angularly adjusted by an angle of 60°, corresponding to the change in position of pins 16, 17 from that of Fig. 2 to that of Fig. 3 or vice versa. This adjustment is effected by relative angular movement between the blade 1 and support 21. The angle of adjustment depends upon the number of sides of the blade 1. Instead of a hexagon, other regular polygons may be used so long as adjacent flat sides are available selectively for cooperation with the resiliently operated detents 26 and 27.

In operation, as the handle 2 is rotated in a clockwise direction as indicated in Fig. 2, the blade 1 is moved in a clockwise direction. This movement of the blade moves the support 21 in the same direction by virtue of the resilient connection provided by the detents 26 and 27. The same action applies when the drive is in the counterclockwise direction, as viewed in Fig. 3.

In Fig. 6 the drive structure is incorporated in a square blade 32 carried by a handle structure 33 including the angularly adjustable support 21. The structure of these elements is the same as that shown in Fig. 1. A socket wrench 34 may be carried by the lower end of the blade 32. The handle 33 carries a crossbar 35 for ready manual manipulation. In this instance, the polygonal section is square, but the same action takes place as with the hexagonal form shown in Figs. 1 to 5.

The assembly of the device is effected quickly and without requiring precision effort. The tubular member 5 may first be assembled with the handle 2. The spring 4, the support 21, and member 3 are assembled on the blade 1. The segments 7 and 8 are next placed into member 5, and on opposite sides of the blade 1. The support 21 with its ring 25 and pins 16 and 17 is now fully inserted into the tubular member 5 so that the pins 16 and 17 extend in the spaces between the segments 7 and 8.

The inventor claims:

1. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; a member angularly adjustable about the shaft axis between two positions; said member having abutments cooperating with the segments, and corresponding in number to the number of segments and each angularly spaced between adjacent segments; the said two positions corresponding to opposite directions of drive between the cylindrical surface and the segments; and means resiliently retaining said member in either of said angular positions.

2. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; a member angularly adjustable about the shaft axis between two positions; said member having abutments cooperating with the segments, and corresponding in number to the number of segments and each angularly spaced between adjacent segments; the said two positions corresponding to opposite directions of drive between the cylindrical surface and the segments; said shaft having at least one other flat surface adjacent one of the said flat surfaces; and a resiliently operated detent carried by the member and optionally engaging either of said adjacent surfaces for determining the angular position of the member.

3. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; a member angularly adjustable about the shaft axis between two positions; said member having abutments cooperating with the segments, and corresponding in number to the number of segments and each angularly spaced between adjacent segments; the said two positions corresponding to opposite directions of drive between the cylindrical surface and the segments; said shaft having another pair of flat surfaces respectively adjacent a pair of said cooperating flat surfaces; and a pair of resiliently operated detents carried by the member, one for each set of adjacent surfaces and optionally engaging each of said surfaces, for determining the angular position of said member.

4. In a clutch mechanism: a shaft having angularly spaced flat surfaces; means providing a recess into which the shaft extends, said recess forming an internal cylindrical friction surface coaxial with the axis of the shaft; a plurality of segments having cooperating friction surfaces and having plane surfaces cooperating respectively with the flat surfaces of the shaft, the clearance between the plane and flat surfaces being such that relative angular rotation in either direction between the shaft and the segments produces a wedging of the friction surfaces against the cylindrical surface; a member guided for angular movement by said recess forming means, and angularly adjustable about the shaft axis between two positions; said member having abutments cooperating with the segments, and corresponding in number to the number of segments and each angularly spaced between adjacent segments; the said two positions corresponding to opposite directions of drive between the cylindrical surface and the segments; and spring-pressed means carried by the member and cooperating with the shaft for resiliently retaining said member in either of said angular positions.

5. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart; the combination therewith of: a plurality of abutments respectively adapted to engage a segment to prevent clutching action in one relative direction of rotation between the shaft and the segments; and resilient means cooperating with surfaces of the shaft for maintaining said abutments so as to be active on either one of a pair of adjacent segments.

6. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart; the combination therewith of: a plurality of abutments respectively adapted to engage a segment to prevent clutching action in one relative direction of rotation between the shaft and the segments; and means for angularly adjusting said abutments between two positions to reverse the direction of drive, comprising a resilient detent optionally cooperating with the adjacent surfaces of the shaft.

7. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart, the combination therewith of: a plurality of abutments respectively adapted to engage a segment to prevent clutching action in one relative direction of rotation between the shaft and the segments; and means for angularly adjusting said abutments to determine which of the corners of the shaft may be active to produce a clutching action.

8. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart, the combination therewith of: a plurality of abutments respectively adapted to engage a segment to prevent clutching action in one relative direction of rotation between the shaft and the segments; and means for angularly adjusting said abutments to determine which of the corners of the shaft may be active to produce a clutching action, including a resilient detent optionally cooperating with surfaces adjacent said corners.

9. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart; the combination therewith of: a member engaging the internal cylindrical surface and angularly adjustable with respect to the shaft; said member having a plurality of abutments respectively disposed between pairs of adjacent segments; and means for maintaining said member in either of two angular positions to render each of the abutments optionally effective upon either of the two adjacent segments for restraining them from clutching engagement.

10. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart; the combination therewith of: a member engaging the internal cylindrical surface and angularly adjustable with respect to the shaft; said member having a plurality of abutments respectively disposed between pairs of adjacent segments; and means for maintaining said member in either of two angular positions to render each of the abutments optionally effective upon either of the two adjacent segments for restraining them from clutching engagement, comprising one or more resiliently operated detents cooperating optionally with surfaces adjacent the corners of the shaft, and carried by the member.

11. In a clutch mechanism having an internal cylindrical surface, a plurality of segments having surfaces adapted frictionally to engage said cylindrical surface, and a shaft having a non-circular cross-section forming corners which upon angular movement relative to the segments, serve to urge the segments apart; the combination therewith of: a member engaging the internal cylindrical surface and angularly adjustable with respect to the shaft; said member having a plurality of abutments respectively disposed between pairs of adjacent segments; and means for maintaining said member in either of two angular positions to render each of the abutments optionally effective upon either of the two adjacent segments for restraining them from clutching engagement, comprising one or more resiliently operated detents cooperating optionally with surfaces adjacent the corners of the shaft, and carried by the member; the angular adjustment being such as to optionally render either of each two adjacent segments ineffective to provide a clutching action.

No references cited.